US011917362B2

(12) United States Patent
Yang et al.

(10) Patent No.: US 11,917,362 B2
(45) Date of Patent: Feb. 27, 2024

(54) SPEAKER BOX

(71) Applicant: AAC Microtech (Changzhou) Co., Ltd., Changzhou (CN)

(72) Inventors: Huhu Yang, Shenzhen (CN); Wenli Wang, Shenzhen (CN); Zhaoyu Yin, Shenzhen (CN); Wei Wei, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 144 days.

(21) Appl. No.: 17/826,193

(22) Filed: May 27, 2022

(65) Prior Publication Data

US 2023/0247348 A1 Aug. 3, 2023

(30) Foreign Application Priority Data

Jan. 25, 2022 (CN) ......................... 202220211849.3

(51) Int. Cl.
*H04R 1/28* (2006.01)
*H04R 9/02* (2006.01)

(52) U.S. Cl.
CPC ............. *H04R 1/288* (2013.01); *H04R 9/025* (2013.01)

(58) Field of Classification Search
CPC ................................ H04R 1/288; H04R 9/025
USPC .......................................................... 381/353
See application file for complete search history.

(56) References Cited

U.S. PATENT DOCUMENTS

| | | | | |
|---|---|---|---|---|
| 2008/0069387 A1* | 3/2008 | Cheung | H04R 1/028 | 381/301 |
| 2016/0127824 A1* | 5/2016 | Jiang | H04R 9/02 | 381/349 |
| 2017/0289672 A1* | 10/2017 | Yang | H04R 1/22 | |
| 2017/0303033 A1* | 10/2017 | Shao | H04R 9/025 | |
| 2018/0027322 A1* | 1/2018 | Shi | H04R 1/288 | 381/353 |
| 2018/0035198 A1* | 2/2018 | Zhong | H04R 9/025 | |
| 2018/0302724 A1* | 10/2018 | Li | H04R 1/06 | |

* cited by examiner

*Primary Examiner* — Sean H Nguyen
(74) *Attorney, Agent, or Firm* — W&G Law Group

(57) ABSTRACT

The present invention provides a speaker box including a housing with a sound hole and a speaker therein. The speaker includes a frame, a vibration system, a magnetic circuit system, and a covering shell. The vibration system includes a diaphragm dividing a receiving room of the housing into a front cavity communicating with the sound hole and a rear cavity, a voice coil assembly. The magnetic circuit system includes a yoke. The covering shell divides the rear cavity into a first rear cavity inside the speaker and a second rear cavity outside the speaker. The covering shell includes a bottom wall and a side wall. A recessing portion formed on the side wall, and the recessing portion communicates the first rear cavity with the second rear cavity.

7 Claims, 4 Drawing Sheets

SPEAKER BOX

FIELD OF THE PRESENT INVENTION

The present invention relates to transducer, and more particularly, to a speaker box.

DESCRIPTION OF RELATED ART

Speaker boxes are commonly used sound-generating devices in electronic equipment, and the speaker box usually includes a housing and a sound-generating unit (speaker) accommodated in the housing. In the related art, the speaker box includes an upper cover, a lower cover assembled with the upper cover to form a receiving space, a sound-generating unit received in the receiving space, and a mesh assembly. The mesh assembly includes a support that fixing to the upper cover and surrounding the sound-generating unit, and a mesh located between the sound-generating unit and the lower cover. A periphery of the mesh is fixed to the support. The sound-generating unit and the mesh assembly cooperatively divide the receiving space into a front cavity and a rear cavity, so as to realize a fully canned structure in the rear cavity.

However, in the prior art, the sound-generating unit needs to be provided with a support and a mesh, which is generally only set on one side of the sound-generating unit, and the filling area of sound-absorbing particles is relatively limited. Moreover, the fixing method of such a support and the mesh is complicated and unstable.

Therefore, it is desired to provide a new speaker box which can overcome the above problems.

SUMMARY

In view of the above, the embodiment of the present invention provides a new speaker box. By the present invention, the speaker box has the advantages of stable structure, simple process and low cost.

The present invention provides a speaker box including a housing having a receiving room and a speaker accommodated in the receiving room. The housing includes a sound hole. The speaker includes a frame, a vibration system and a magnetic circuit system supported on the frame, and a covering shell mounted with the frame. The vibration system includes a diaphragm dividing the receiving room into a front cavity communicating with the sound hole and a rear cavity opposite to the front cavity, a voice coil assembly driving the diaphragm to generate sounds. The magnetic circuit system includes a yoke and a magnet assembly mounted on the yoke. The covering shell divides the rear cavity into a first rear cavity inside the speaker and a second rear cavity outside the speaker. A plurality of sound-absorbing particles is filled in the second rear cavity. The covering shell includes a bottom wall connecting to the yoke and a side wall bending and extending from the bottom wall. A recessing portion is formed by recessing from an edge of the side wall away from the bottom wall, and the recessing portion communicates the first rear cavity with the second rear cavity.

As an improvement, the side wall of the covering shell comprises a plurality of side wall portions enclosing to form a polygon, and each side wall portion has the recessing portion.

As an improvement, several recessing portions form a group, and each side wall portion is provided with at least one group of the recessing portions.

As an improvement, the adjacent recessing portions in each group of the recessing portions are arranged with an equal interval.

As an improvement, the recessing portion is formed on the side wall of the covering shell by stamping.

As an improvement, a width of the recessing portion is gradually decreasing from the edge of the side wall away from the bottom wall toward a direction of the bottom wall.

As an improvement, the frame comprises a protrusion extending toward the covering shell, the protrusion comprising a bottom surface, an upper surface opposite to the bottom surface, and a side surface connecting the bottom surface and the upper surface, at least a portion of the bottom wall of the covering shell is attached to the bottom surface of the protrusion, and the side wall of the covering shell is attached to the side surface of the protrusion.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of the present invention more apparent, the present invention is described in further detail together with the figure and the embodiment. It should be understood the specific embodiment described hereby is only to explain the disclosure, not intended to limit the disclosure.

Figure 1:
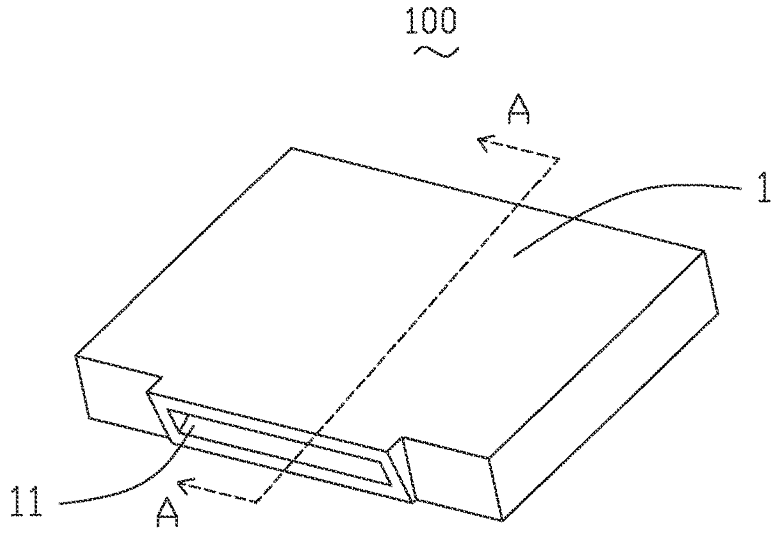
FIG. 1 is an illustrative isometric view of a speaker box in accordance with one embodiment of the present invention.
Figure 2:
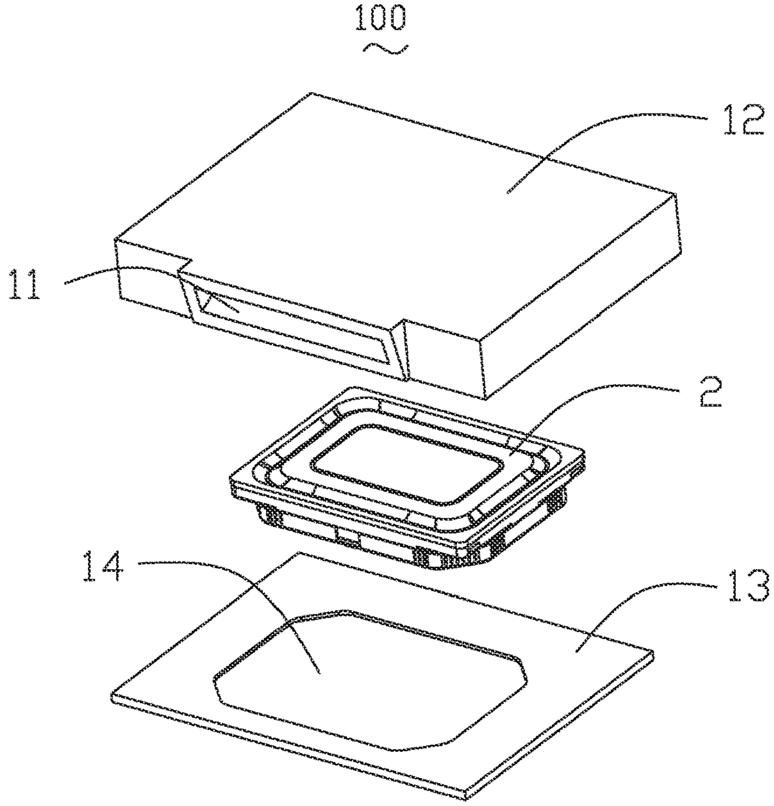
FIG. 2 is a partially exploded view of the speaker box of FIG. 1.
Figure 3:
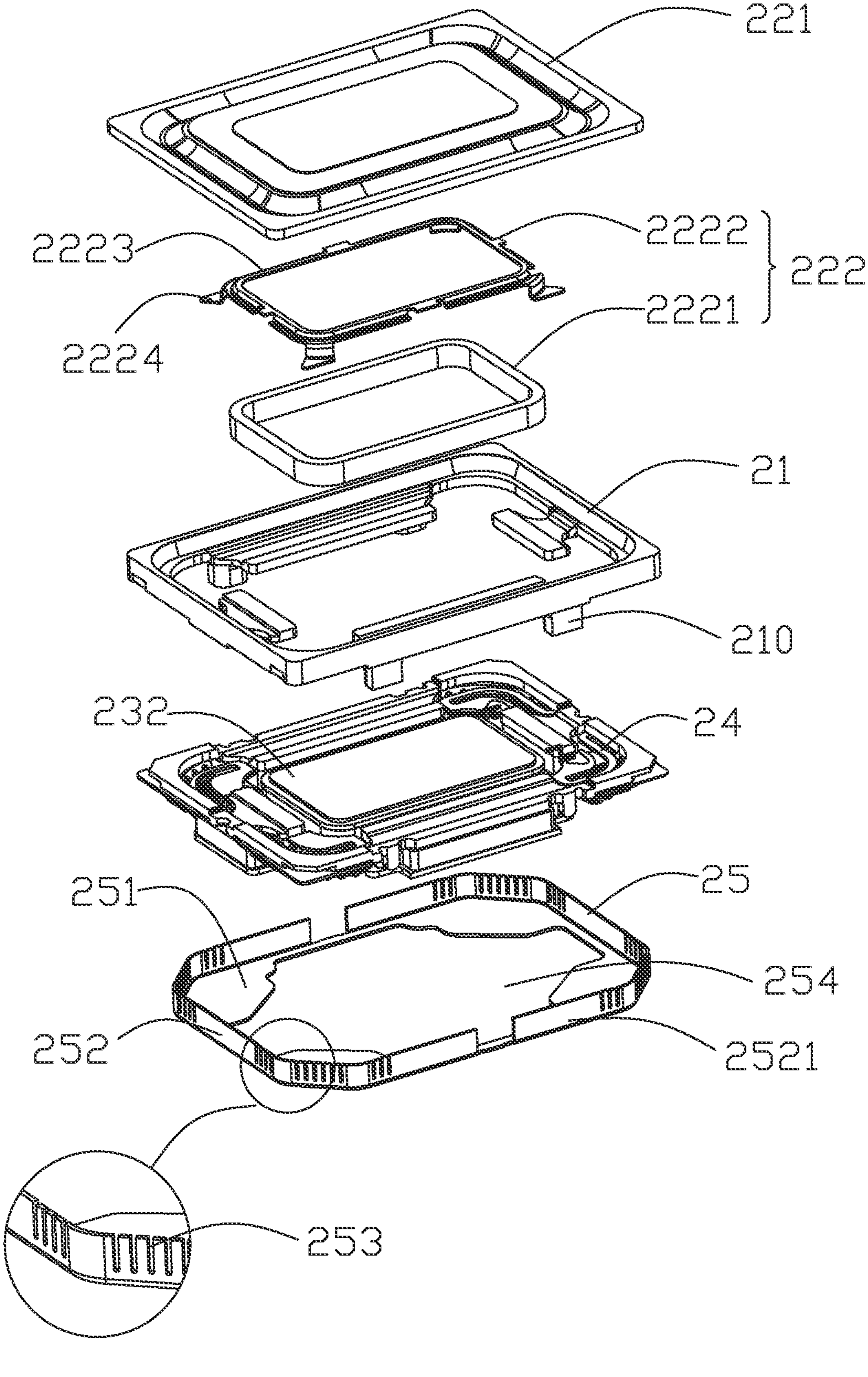
FIG. 3 is a partially exploded view of a speaker of the speaker box of FIG. 1.
Figure 4:
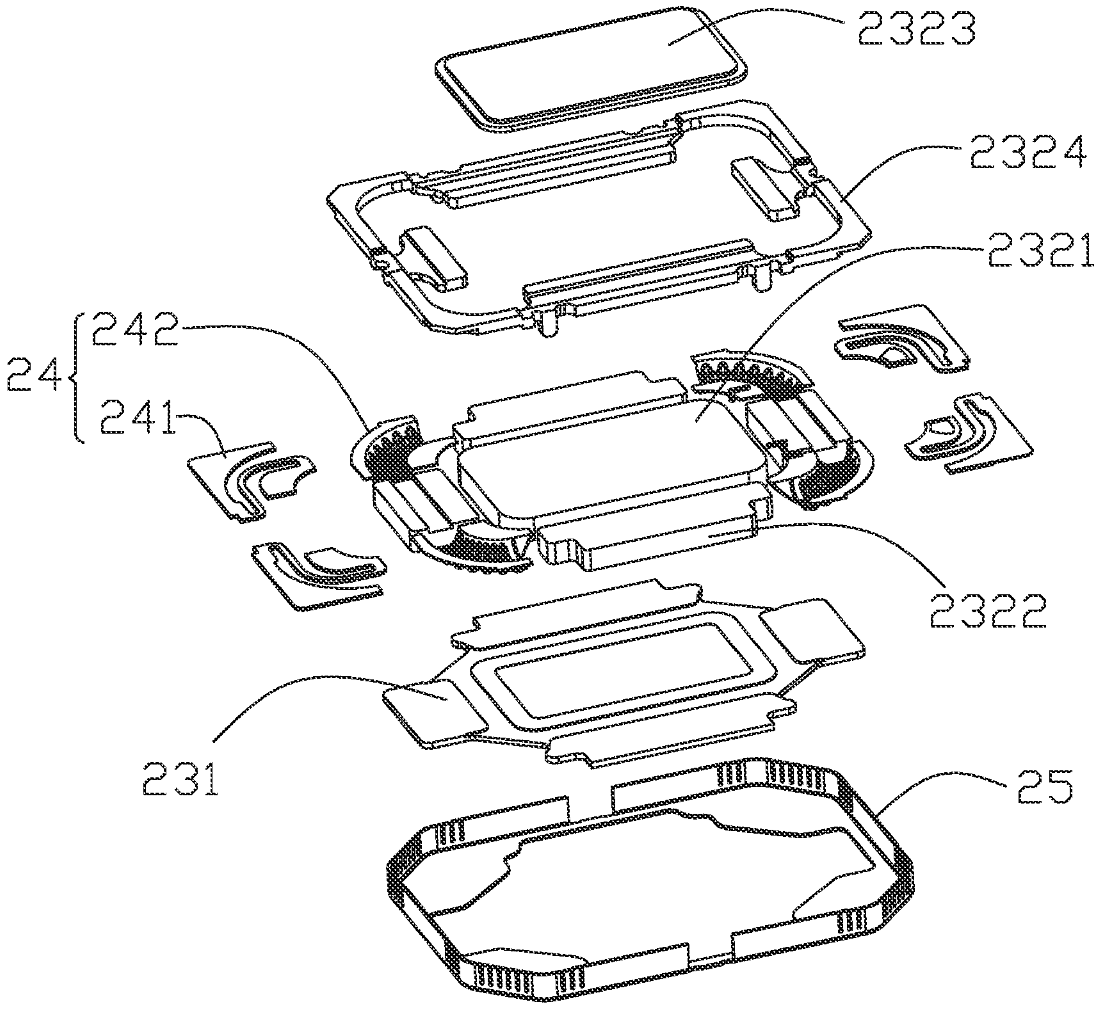
FIG. 4 is an exploded view of partly members of the speaker box of FIG. 1.
Figure 5:
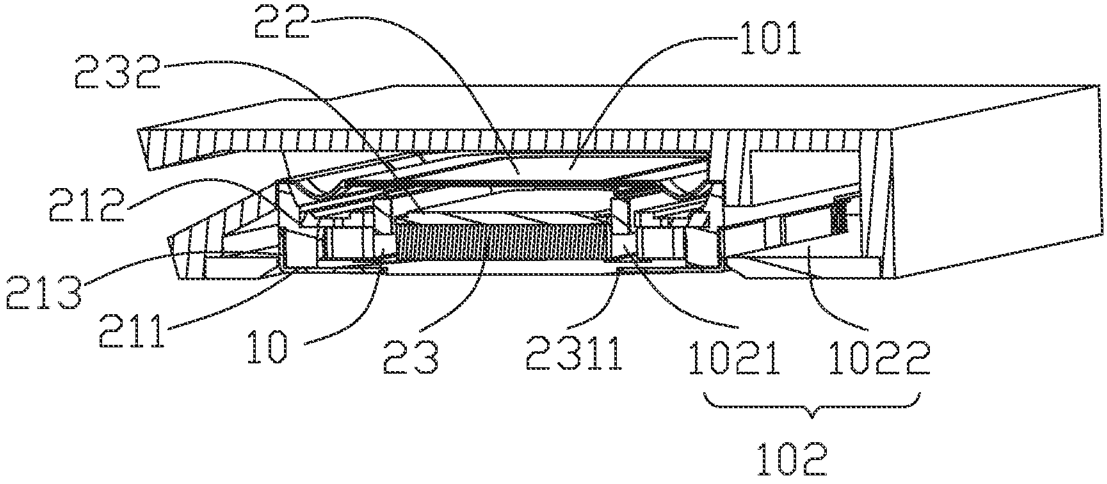
FIG. 5 is an illustrative cross-sectional view of the speaker box taken along line A-A of FIG. 1.

Referring to the FIGS. 1-5, the present invention provides one embodiment of a speaker box 100. The speaker box 100 includes a housing 1 having a receiving room 10 and a speaker 2 accommodated in the receiving room 10. The housing 1 includes a first housing 12 provided with a sound hole 11 and a second housing 13 cooperatively forming the receiving room 10 with the first housing 12. The second housing 13 is provided with a first through hole 14 therethrough.

The speaker 2 includes a frame 21, a vibration system 22 and a magnetic circuit system 23 supported on the frame 21 respectively, a support assembly 24 connecting the vibration system 22 and the frame 21, and a covering shell 25 mounted with the frame 21. The magnetic circuit system 23 drives the vibration system 22 to generate sounds.

The frame 21 is a rectangular annular hollow structure, and the frame 21 includes a protrusion 210 extending toward a direction of the covering shell 25. The protrusion 210 has a bottom surface 211, an upper surface 212 opposite to the bottom surface 211, and a side surface 213 connecting the bottom surface 211 and the upper surface 212. This side surface 213 is specifically indicated as an outer side surface of the protrusion 210.

The vibration system 22 includes a diaphragm 221, a voice coil assembly 222 driving the diaphragm 221 to generate sounds. The voice coil assembly 222 includes a voice coil 2221 and a voice carrier 2222 supported between the diaphragm 221 and the voice coil 2221. The diaphragm 221 divides the receiving room 10 into a front cavity 101 communicating with the sound hole 11 and a rear cavity 102 opposite to the front cavity 101. The voice carrier 2222 includes a main body portion 2223 with an annular structure and a supporting portion 2224 bending and extending from the main body portion 2223. And the each of the four corners of the main body portion 2223 is provided with one support portion 2224.

The magnetic circuit system 23 includes a yoke 231 and a magnet assembly 232 mounted on the yoke 231. The magnet assembly 232 includes a main magnet 2321 fixed on the yoke 231, and a plurality of auxiliary magnets 2322 around and spaced apart from the main magnet 2321 for forming a magnetic gap, a main pole plate 2323 disposed on the main magnet 2321, and an auxiliary pole plate 2324 covered on the auxiliary magnets 2322. The voice coil 2221 is at least partially located into the magnetic gap, so that after the voice coil 2221 is energized, the voice coil 2221 will vibrate under an action of a magnetic field of the magnetic circuit system 23.

The yoke 231 includes a receiving groove 2311 recessed from a lower surface of the yoke 231 toward a direction of the diaphragm 221.

There are four support assemblies 24, which are respectively arranged at each of the four corners of the frame 21. One end of the support assembly 24 is connected with the voice coil assembly 222, and the other end is connected with the frame 21. The support assembly 24 includes a flexible printed circuit board 241 and a support membrane 242 stacked under the flexible printed circuit board 241. The flexible printed circuit board 241 is fixedly connected to the support portion 2224 of the voice carrier 2222 of the voice coil assembly 222.

The covering shell 25 is fixed with the frame 21 and the yoke 231. The covering shell 25 divides the rear cavity 102 into a first rear cavity 1021 inside the speaker 2 and a second rear cavity 1022 outside the speaker 2. A plurality of sound-absorbing particles is filled in the second rear cavity 1022. The covering shell 25 prevents the sound-absorbing particles from entering the second rear cavity 1022. The covering shell 25 includes a bottom wall 251 connecting to the yoke 231 and a side wall 252 bending and extending from the bottom wall 251. The side wall 252 is attached with the auxiliary magnets 2322. In this embodiment, even if a part of the side wall 252 is provided with a groove structure, the sound-absorbing particles will not enter into the first rear cavity 1021 because of the side wall is attached with the auxiliary magnets 2322.

A recessing portion 253 is formed by recessing from an edge of the side wall 252 away from the bottom wall 251, and the recessing portion 253 communicates the first rear cavity 1021 with the second rear cavity 1022. The side wall 252 of the covering shell 25 comprises a plurality of side wall portions 2521 enclosing to form a polygon, and each side wall portion 2521 has the recessing portion 253.

Several recessing portions 253 form a group, and the recessing portions 253 in each group are in a zigzag shape. Each side wall portion 2521 is provided with at least one group of the recessing portions 253. The adjacent recessing portions 253 in each group of the recessing portions 253 are arranged with an equal interval. Due to the recessing portion 253 extending from the edge of the side wall 252, the recessing portion 253 can be formed on the side wall 252 of the covering shell 25 by stamping. A width of the recessing portion 253 is gradually decreasing from the edge of the side wall 252 away from the bottom wall 251 toward a direction of the bottom wall 251.

A shape of the bottom wall 251 of the covering shell 25 fits with the shape of the first through hole 14. At least a portion of the bottom wall 251 of the covering shell 25 is attached to the bottom surface 211 of the protrusion 210 of the frame 21, and the side wall 252 of the covering shell 25 is attached to the side surface 213 of the protrusion 210 of the frame 21. A portion of the bottom wall 251 of the covering shell 25 extends into the receiving groove 2311 of the yoke 231 and is fixed in the receiving groove 2311. A second through hole 254 is formed on an end of the bottom wall 251 away from the side wall 252, and a part of the yoke 231 is exposed to the second through hole 254.

Comparing with the related art, the speaker box of present invention including a housing having a receiving room and a speaker accommodated in the receiving room. The housing includes a sound hole. The speaker includes a frame, a vibration system and a magnetic circuit system supported on the frame, and a covering shell mounted with the frame. The vibration system includes a diaphragm dividing the receiving room into a front cavity communicating with the sound hole and a rear cavity opposite to the front cavity, a voice coil assembly driving the diaphragm to generate sounds. The magnetic circuit system includes a yoke and a magnet assembly mounted on the yoke. The covering shell divides the rear cavity into a first rear cavity inside the speaker and a second rear cavity outside the speaker. A plurality of sound-absorbing particles is filled in the second rear cavity. The covering shell includes a bottom wall connecting to the yoke and a side wall bending and extending from the bottom wall. A recessing portion is formed by recessing from an edge of the side wall away from the bottom wall, and the recessing portion communicates the first rear cavity with the second rear cavity.

In present invention, the recessing portion acts as a leakage structure and has a better acoustic performance. Optionally, the leakage structure of the side wall also can be arranged with a plurality of leaking hole with small size. However, these covering shells are made of steel sheet or aluminum sheet or PET or other materials, and the leaking holes on these covering shells are formed by laser hole burning, die drilling, etching and so on. And then making the material with the leaking holes to form the covering shells. For leaser hole burning, the efficiency of the laser hole burning is low, and the consistency of the apertures of the leaking holes is difficult to guarantee. For die drilling, the die punching strength is insufficient, and the risk of needle breakage is high. For etching, the process of etching small holes is complicated and the cost is high. Therefore, the recessing portion of the present invention can be stamped as a leakage structure in the molding method, with high efficiency and low cost, and the leakage of the recessing portion is larger than that of the small size leaking hole, which is more beneficial to the acoustic performance.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker box, comprising:

a housing having a receiving room, the housing comprising a sound hole;

a speaker accommodated in the receiving room, the speaker comprising:

a frame;

a vibration system supported on the frame, the vibration system comprising:

a diaphragm dividing the receiving room into a front cavity communicating with the sound hole and a rear cavity opposite to the front cavity;

a voice coil assembly driving the diaphragm to generate sounds;

a magnetic circuit system supported on the frame, the magnetic circuit system comprising a yoke and a magnet assembly mounted on the yoke;

a covering shell mounted with the frame and the yoke, the covering shell dividing the rear cavity into a first rear cavity inside the speaker and a second rear cavity outside the speaker, a plurality of sound-absorbing particles filled in the second rear cavity, and the covering shell comprising a bottom wall connecting to the yoke and a side wall bending and extending from the bottom wall, a recessing portion formed by recessing from an edge of the side wall away from the bottom wall, and the recessing portion communicating the first rear cavity with the second rear cavity.

2. The speaker box as described in claim 1, wherein the side wall of the covering shell comprises a plurality of side wall portions enclosing to form a polygon, and each side wall portion has the recessing portion.

3. The speaker box as described in claim 2, wherein several recessing portions form a group, and each side wall portion is provided with at least one group of the recessing portions.

4. The speaker box as described in claim 3, wherein the adjacent recessing portions in each group of the recessing portions are arranged with an equal interval.

5. The speaker box as described in claim 1, wherein the recessing portion is formed on the side wall of the covering shell by stamping.

6. The speaker box as described in claim 1, wherein a width of the recessing portion is gradually decreasing from the edge of the side wall away from the bottom wall toward a direction of the bottom wall.

7. The speaker box as described in claim 1, wherein the frame comprises a protrusion extending toward the covering shell, the protrusion comprising a bottom surface, an upper surface opposite to the bottom surface, and a side surface connecting the bottom surface and the upper surface, at least a portion of the bottom wall of the covering shell is attached to the bottom surface of the protrusion, and the side wall of the covering shell is attached to the side surface of the protrusion.

* * * * *